US011118270B1

(12) United States Patent
Arumugam et al.

(10) Patent No.: US 11,118,270 B1
(45) Date of Patent: Sep. 14, 2021

(54) METHOD FOR PREPARING ICEPHOBIC/SUPERHYDROPHOBIC SURFACES ON METALS, CERAMICS, AND POLYMERS

(71) Applicant: Oceanit Laboratories, Inc., Honolulu, HI (US)

(72) Inventors: Ganesh Kumar Arumugam, Honolulu, HI (US); Vinod Veedu, Houston, TX (US)

(73) Assignee: Oceanit Laboratories, Inc., Honolulu, HI (US)

( * ) Notice: Subject to any disclaimer, the term of this patent is extended or adjusted under 35 U.S.C. 154(b) by 0 days.

(21) Appl. No.: 14/956,375

(22) Filed: Dec. 1, 2015

Related U.S. Application Data

(60) Provisional application No. 62/086,182, filed on Dec. 1, 2014.

(51) Int. Cl.
| | | |
|---|---|---|
| C23C 28/04 | (2006.01) | |
| C23F 1/16 | (2006.01) | |
| C25D 11/02 | (2006.01) | |
| C25D 11/04 | (2006.01) | |
| C23C 30/00 | (2006.01) | |
| B05D 5/00 | (2006.01) | |
| C25D 11/12 | (2006.01) | |

(52) U.S. Cl.
CPC ............... *C23C 28/04* (2013.01); *B05D 5/00* (2013.01); *C23C 30/00* (2013.01); *C23F 1/16* (2013.01); *C25D 11/02* (2013.01); *C25D 11/04* (2013.01); *C25D 11/12* (2013.01)

(58) Field of Classification Search
CPC ....................................................... B05D 5/00
See application file for complete search history.

(56) References Cited

U.S. PATENT DOCUMENTS

| | | | | |
|---|---|---|---|---|
| 3,725,150 A * | 4/1973 | George | ................... | H01L 21/00 148/DIG. 106 |
| 3,996,115 A * | 12/1976 | Kessler | ................... | C23C 22/00 205/316 |
| 4,710,232 A * | 12/1987 | Tahbaz | ................... | C23G 5/06 134/1 |
| 8,216,674 B2 * | 7/2012 | Simpson | ............... | C09C 1/3081 428/323 |
| 2007/0141114 A1 * | 6/2007 | Muisener | ................. | B05D 7/50 424/427 |
| 2008/0268233 A1 * | 10/2008 | Lawin | ....................... | C09D 5/00 428/327 |
| 2009/0018249 A1 * | 1/2009 | Kanagasabapathy | .... | C09D 1/00 524/434 |
| 2011/0229367 A1 * | 9/2011 | Chiu | ......................... | C22C 9/00 420/471 |
| 2013/0015122 A1 * | 1/2013 | Awadh | ................... | B82Y 30/00 210/500.21 |

(Continued)

OTHER PUBLICATIONS

Aqion, pH of Organic Acids and Salts, https://www.aqion.de/site/192, Oct. 27, 2020.*

*Primary Examiner* — James M Mellott
(74) *Attorney, Agent, or Firm* — Fresh IP PLC; Clifford D. Hyra; Aubrey Y Chen

(57) ABSTRACT

A method for preparing an icephobic surface includes cleaning, etching and anodizing a target surface and applying fluorinated nanoparticles to the cleaned, etched and anodized target surface. A surface is treated according to this method.

21 Claims, 7 Drawing Sheets

(56) References Cited

U.S. PATENT DOCUMENTS

2014/0110263 A1* 4/2014 Barbier ................ C25D 11/08
                                                                                 205/50
2014/0155522 A1* 6/2014 Simpson .............. C09D 127/22
                                                                                 523/400
2016/0289810 A1* 10/2016 Bleecher ................ C09D 7/70

* cited by examiner

METHOD FOR PREPARING ICEPHOBIC/SUPERHYDROPHOBIC SURFACES ON METALS, CERAMICS, AND POLYMERS

This application claims the benefit of U.S. Provisional Application No. 62/086,182, filed Dec. 1, 2014, and is related to copending U.S. Nonprovisional application Ser. No. 13/951,065 filed Jul. 25, 2013, each of which is hereby incorporated by reference in its entirety.

This invention was made with Government support under Contract FA8650-14-M-2505 awarded by the U.S. Air Force. The Government has certain rights in this invention.

FIELD OF THE INVENTION

The application relates generally to surface treatments and coatings to prevent ice formation/snow accumulation and improve corrosion resistance and water repellency.

BACKGROUND

Conventional approaches to ice formation on metallic or polymer surfaces involve the use of icephobic coating material mainly composed of a low surface energy polymer material. Several different low surface energy polymer coatings are available in the market, but they lack long term ice repellency, do not have low ice adhesion strength and are not suitable for many applications due to the thickness of the coatings and lack of protection against ice formation. Existing coating technology lacks ice repellent properties, which are especially desired for applications such as heat exchangers, condensers, aircraft wings, helicopter rotor blades, wind mills, automobiles, transparent windscreens, canopies, etc. The ice adhesion strength of commonly used icephobic coatings is high and they also possess very low durability. Needs exist for improved icephobic coatings and surfaces having improved icephobic properties and durability and low ice adhesion strength.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

A novel icephobic (ice repellent) coating for metallic (e.g. aluminum, copper, iron, nickel-based) and other surfaces is achieved through a scalable surface treatment and coating process.

A new method for preparing an icephobic surface includes cleaning and etching and/or anodizing a target surface and applying fluorinated nanoparticles to the cleaned and etched and/or anodized target surface. The cleaning and etching and/or anodizing of the target surface may include a first step of cleaning the target surface with at least one a degreasing hydrocarbon and an alcohol and etching the target surface a first time with 0.1 to 5M of etching base for 1 to 15 minutes, a second step of anodizing the target surface a first time for 0.25 to four hours with 0.3 to 2M of acid at 0 to 10° C. and 1-40V and etching for a second time with 0.1 to 5M of etching base, and a third step of anodizing the target surface a second time with 0.3 to 3M of acid at 0-10° C. and 1-40V, and etching a third time with 1M of etching base for 1 to 3 minutes. The etching may include immersing the target surface in 5% nitric acid for 1 to 60 minutes at 15 to 75° C. temperature, with the target surface including a metal substrate. The anodizing may include immersing the target surface in 0.3 to 3M oxalic acid of pH<3 and applying a voltage of 1-40V at 0-10° C. for 3 minutes to eight hours. In embodiments, the etching base used for any of the first, second and third etchings may include at least one of sodium hydroxide and potassium hydroxide and the acid used for any of the first and second anodizings may include at least one of oxalic acid, sulfuric acid, hydrochloric acid, and nitric acid. The etching base used for each of the first, second and third etchings may be the same or different. The acid used for each of the first and second anodizings may be the same or different.

The method may also include preparing the fluorinated nanoparticles by combining silica nanoparticles with trichloro (1h 1h 2h 2h-perfluorooctyl) silane molecules. The method may also include applying functional groups of nanoparticles to the target surface. Applying the fluorinated silica nanoparticles may include at least one of spraying and deposition of the nanoparticles.

A new surface is treated according to the new method. The surface may have surface modifications with pores ranging from 5-500 nm in diameter and depth ranging from 50-5000 nm.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

DETAILED DESCRIPTION

Figure 1:
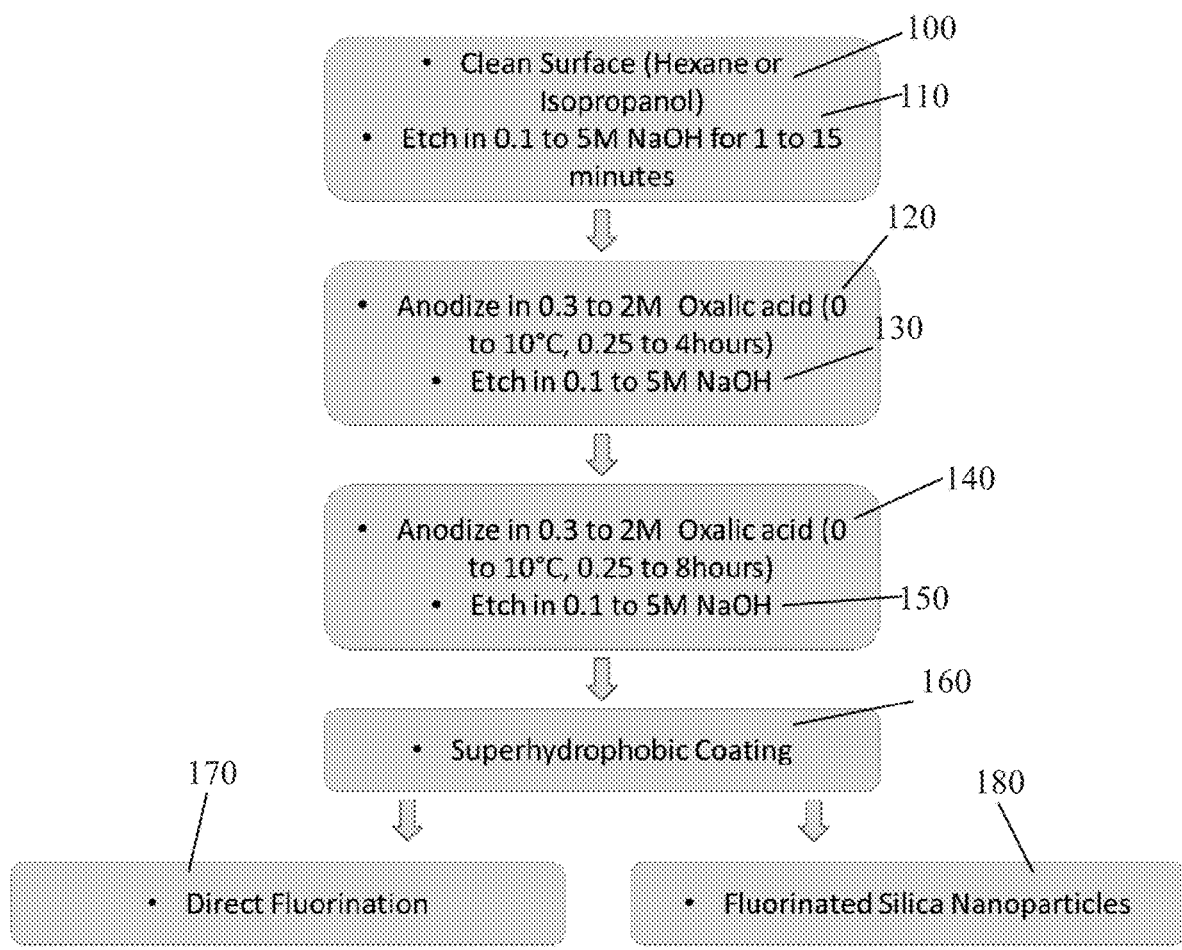
FIG. 1 is a flowchart of an icephobic surface preparation process, in an embodiment.

A method for preparing icephobic/superhydrophobic surfaces on metals, ceramics, and polymers will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The figures are not to scale. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 6:
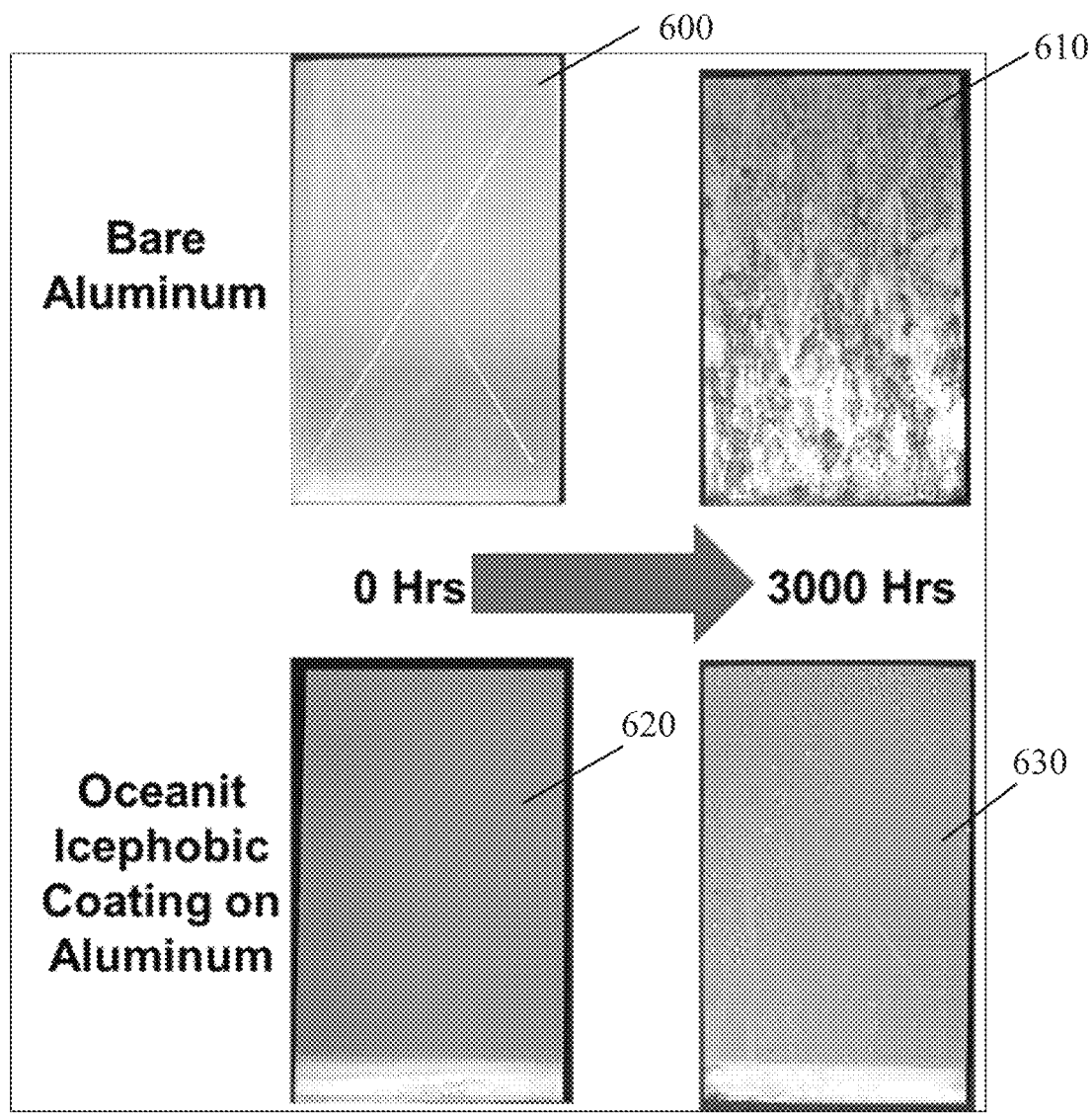
FIG. 6 is a photograph showing uncoated and coated aluminum coupons before and after exposure in a salt fog chamber.

A new durable icephobic coating for metal (or ceramic, polymer, etc.) surfaces is created by preparing a surface with cleaning, etching, and anodizing and then applying fluorinated nanoparticles (for example fluorinated silica nanoparticles as described with reference to FIG. 2). The fluorinated nanoparticles can be easily applied on intricate components and hard to reach areas by spraying or deposition, unlike other coatings that require painting or brushing onto a surface. The surface treatment performed before spraying of the fluorinated silica nanoparticles can also be performed in tight spaces. The resulting icephobic coating lowers the ice adhesion strength of surfaces dramatically and also improves corrosion resistance. The coating also provides superior corrosion resistance as verified by salt fog studies that demonstrated corrosion resistance of icephobic coating on aluminum surface of at least 3000 hours (FIG. 6).

This developed method of surface treatment and icephobic coating provides the lowest ice adhesion strength ever recorded and is one of the easiest for application to large areas. In addition, the coating is effective with a thickness of less than 50 microns and does not significantly increase the weight or alter the thickness or thermal conductivity of the coated surface. The coating also provides a low coefficient of friction for water-based liquids.

FIG. 1 is a flowchart of an icephobic surface preparation process, in an embodiment. First, the surface is cleaned 100 with hexane or isopropanol, and then etched 110 for 1 to 15 minutes with 0.1M to 5M of sodium hydroxide. Next, the surface is anodized 120 for 15 minutes to 4 hrs with 0.3M to 2M oxalic acid at 0° C. to 10° C. and etched 130 with 0.1 to 5M of sodium hydroxide. Then the surface is anodized 140 for 15 minutes to eight hours with 0.3M to 2M oxalic acid at 0° C. to 10° C. and etched 150 with 0.1M to 5M sodium hydroxide.

In other embodiments, the target surface may be cleaned with any degreasing hydrocarbon and/or alcohol. The anodizing 110 and 140 may be performed with 1-40V. In various embodiments, etching and/or anodizing may be repeated various numbers of times. In some embodiments, there may be only etching or only anodizing, and in some etching and/or anodizing may be performed a single time, twice, three times, or more.

These cleaning, etching and anodizing steps 100-150 may cause surface modifications with pores ranging from 5-500 nm in diameter and depth ranging from 50-5000 nm and result in a hydrophilic surface, as discussed in related application Ser. No. 13/951,065. A superhydrophic coating is then applied 160 to the surface. In related application Ser. No. 13/951,065, the use of direct fluorination 170 to form the hydrophobic coating is described. To achieve a coating with strong icephobic properties, fluorinated silica nanoparticles are applied 180 to the surface instead.

The fluorinated nanoparticles are dispersed in a fluorinated solvent and may be sprayed or otherwise applied directly onto the prepared surface. In some embodiments, the surface may be further prepared prior to application of the fluorinated silica nanoparticles by the addition of functional groups of nanoparticles, which may enhance durability of the icephobic coating.

Figure 2:
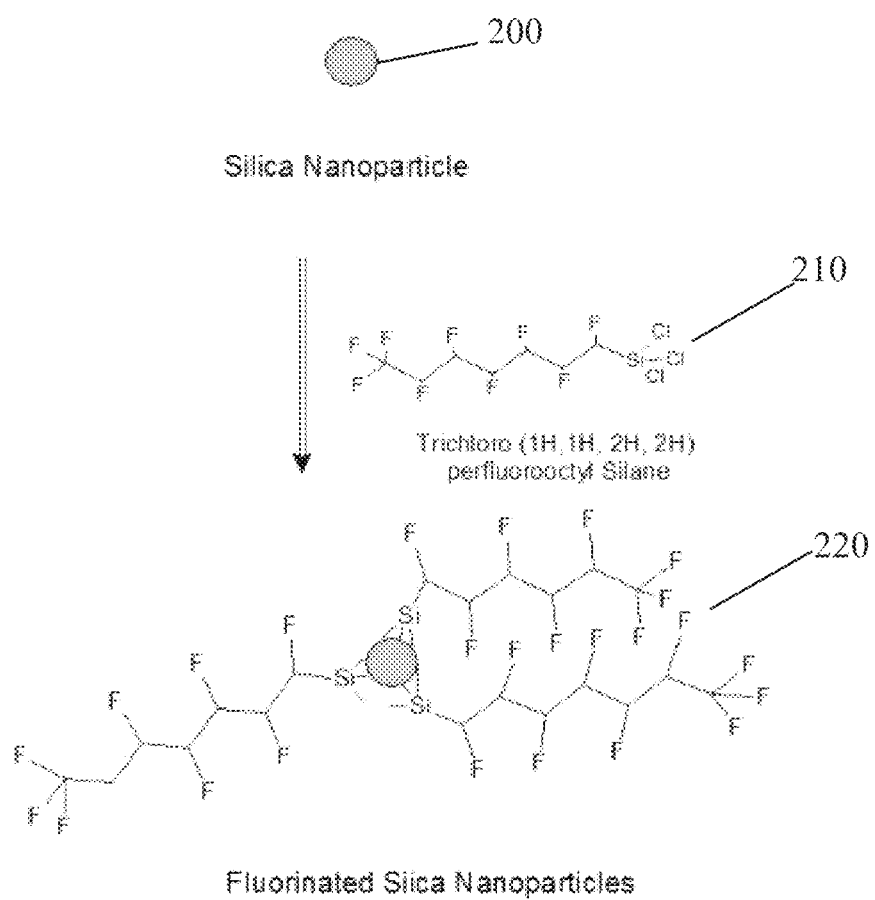
FIG. 2 is a diagram illustrating the synthesis of fluorinated silica nanoparticles.

FIG. 2 is a diagram illustrating the synthesis of fluorinated silica nanoparticles. Silica nanoparticles 200 are combined with trichloro (1h 1h 2h 2h-perfluorooctyl) silane molecules 210 in a known manner to obtain fluorinated silica nanoparticles 220 as shown.

Figure 3:
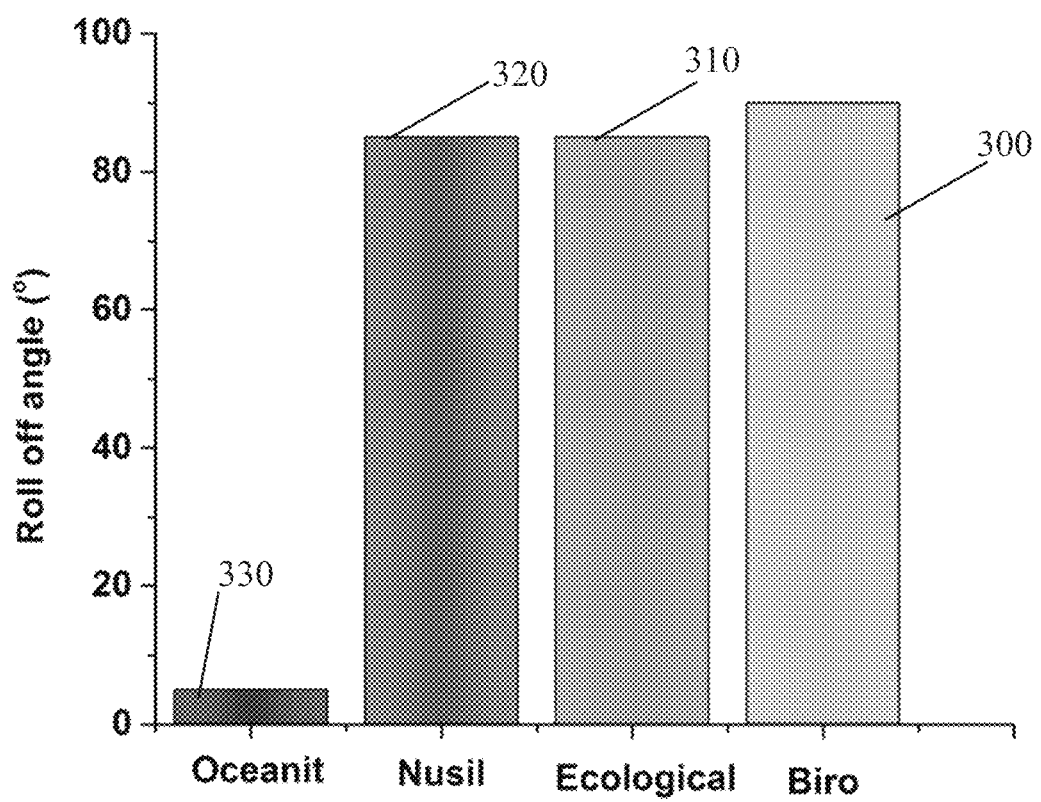
FIG. 3 is a chart comparing the roll-off angle of a surface processed with an icephobic coating according to an embodiment of the claimed invention to that of other icephobic coatings.

FIG. 3 is a chart comparing the roll-off angle of a surface processed with an icephobic coating according to an embodiment of the claimed invention 330 to that of other commercial icephobic coatings 300, 310, 320. The commercial icephobic coatings 300, 310, 320 are silicone-based elastomeric low surface energy coatings. The roll-off angle is the tilt angle of a surface at which a water droplet on the surface begins to move. At about a 5° tilt, water droplets roll off the Oceanit surface, while other treated surfaces do not achieve roll-off until tilted to a nearly 90° angle.

Figure 4:
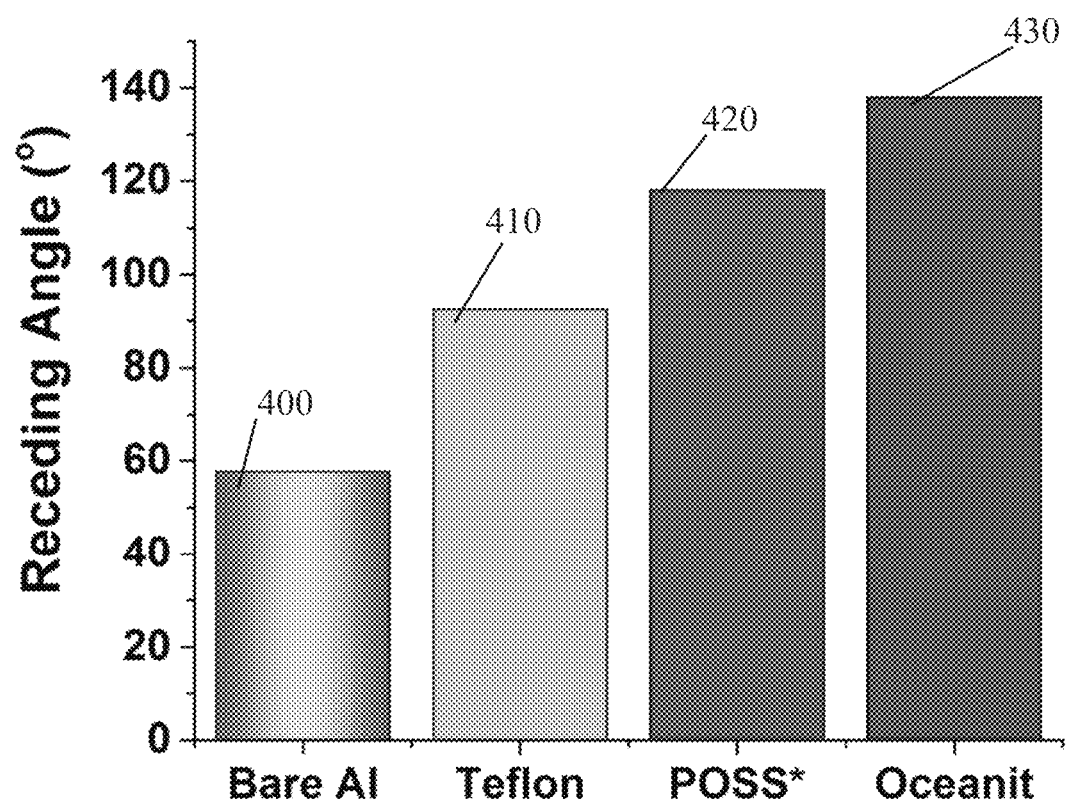
FIG. 4 is a chart comparing the receding angle of a surface processed with an icephobic coating according to an embodiment of the claimed invention to that of other icephobic surfaces.

FIG. 4 is a chart comparing the receding angle of a surface processed with an icephobic coating according to an embodiment of the claimed invention 430 to that of other icephobic surfaces 400 (bare aluminum), 410 (Teflon), polyhedral oligomeric silesquioxane (POSS) 420. The receding angle is the angle between the surface and a water droplet on the surface where the droplet touches the surface. A lower angle indicates that the droplet spreads out more on the surface, forming a shallow pool, while a higher angle indicates that the droplet beads up on the surface, forming a deep, rounded droplet shape. The embodiment of the claimed invention 430 has a receding angle of about 135°, with bare aluminum having a receding angle of under 60°, Teflon about 95°, and POSS under 120°.

Figure 5:
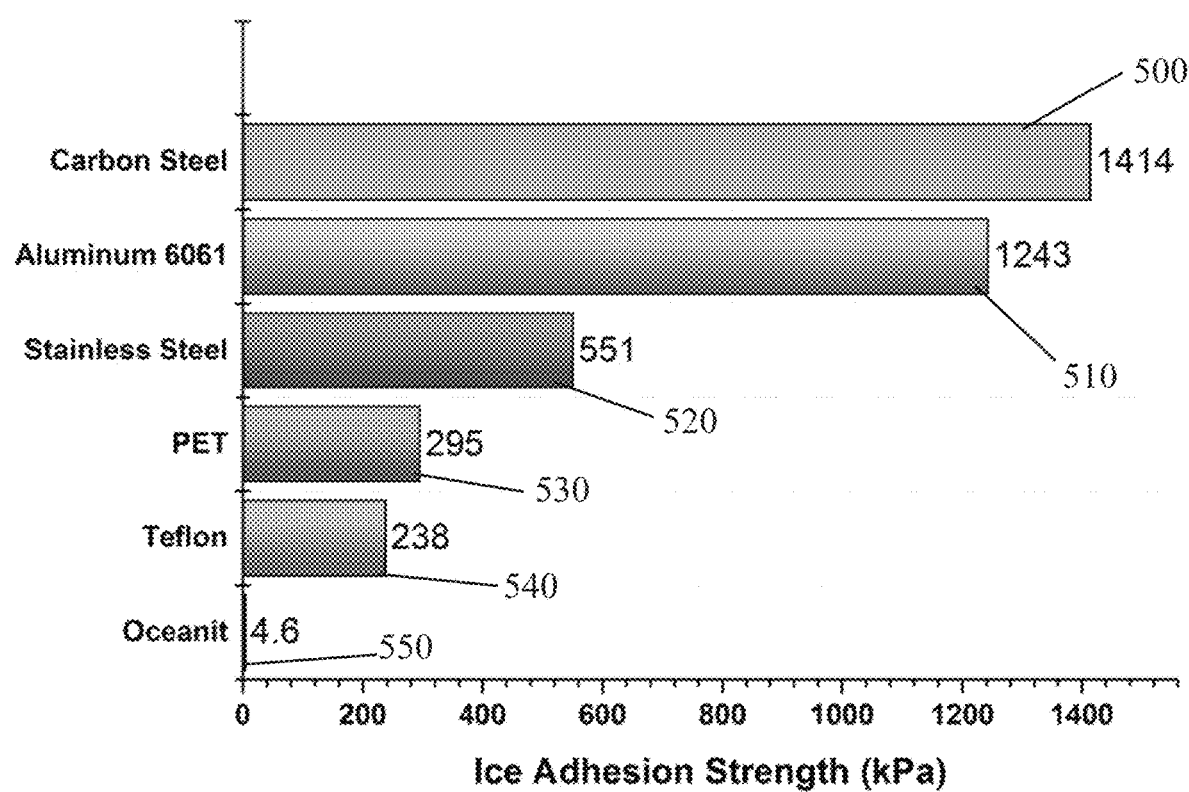
FIG. 5 is a chart comparing the ice adhesion strength of a surface processed with an icephobic coating according to an embodiment of the claimed invention to that of other icephobic surfaces.

FIG. 5 is a chart comparing the ice adhesion strength of a surface processed with an icephobic coating according to an embodiment of the claimed invention 550 to that of other icephobic surfaces 500 (carbon steel), 510 (aluminum 6061), 520 (stainless steel), 530 (Polyethylene terephthalate), 540

(Teflon). Ice adheres only weakly to the Oceanit surface and is easily removed, with an ice adhesion strength of only 4.6 kPa-less than 2% of the ice adhesion strength of the next closest surface, Teflon, at 238 kPa and about 0.3% of the ice adhesion strength of untreated carbon steel at 1414 kPa.

FIG. 6 is a photograph showing uncoated and coated aluminum coupons 600, 620 respectively, before and after 610, 630 exposure in a salt fog chamber. After 3000 hrs of exposure, the untreated coupon exhibits severe surface degradation, while the treated coupon 630 appears nearly unaffected.

Figure 7:
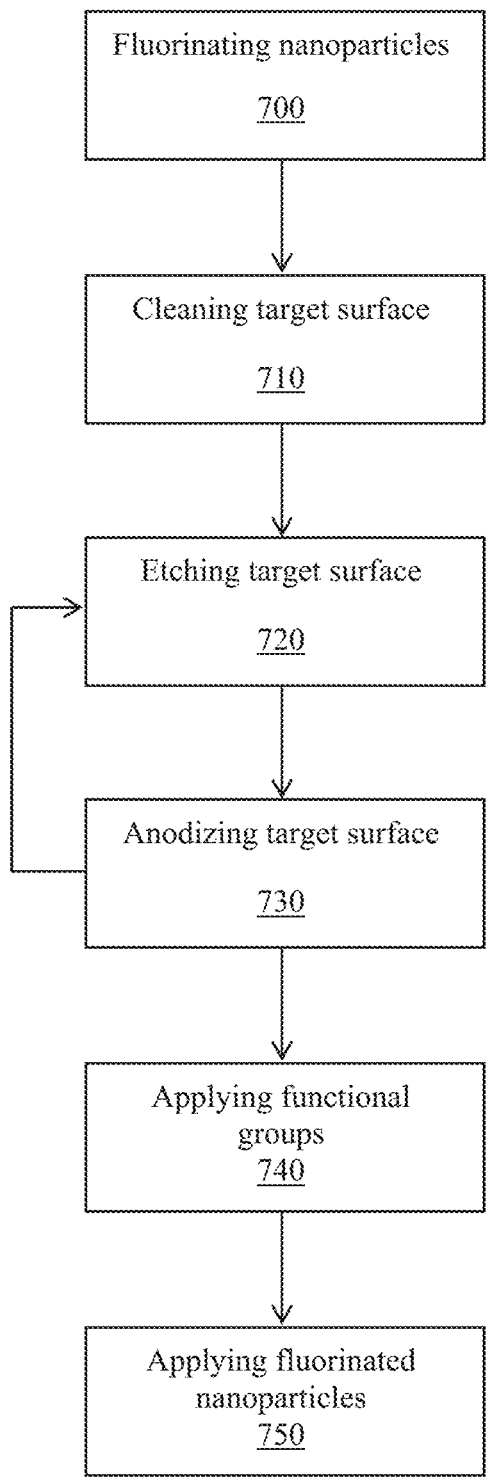
FIG. 7 illustrates an icephobic surface method, according to an embodiment of the present invention.

FIG. 7 illustrates an icephobic surface method, according to an embodiment of the present invention. Nanoparticles are fluorinated 700, for example using one or more of perfluoro octyl trichloro silane, perfluoro octyl phosphonic acid, perfluoro polyhedral oligomeric silsesquioxanes (POSS), trichloro octa decyl, trichlor octyl silane, perfluorosiloxane, fluorohydrocarbon, fluorinated silane, fluorinated acid, amine, phosphoric acid, alcohol, acrylates, epoxy, ester, ethers, and sulfonate. The fluorinated nanoparticles may be prepared by combining silica nanoparticles with trichloro (1h 1h 2h 2h-perfluorooctyl) silane molecules in hydrocarbon-based solvent. Some of the nanoparticles may be metallic (e.g. silver, copper, nickel, palladium) or ceramic (e.g. silica, alumina, titania). This step may be carried out before or after cleaning, etching and anodizing of the target surface.

The target surface is cleaned 710, for example with at least one of a degreasing hydrocarbon and an alcohol, etched 720 with an etching base, and anodized 730 with an acid. The steps of etching 720 and anodizing 730 may then be repeated one or more times. In other embodiments, etching or anodizing may be performed but not both. Etching 720 in embodiments may include immersing the target surface in 5% nitric acid for 1 to 60 minutes at room temperature, where the target surface is a metal substrate. Anodizing 730 in embodiments may include immersing the target surface in 0.3 to 3M oxalic acid of pH<3 and applying a voltage of 1-40V at 0-10° C. for three minutes to eight hours. The target surface may be an aluminum-based alloy or a copper, a nickel or an iron-based alloy.

Functional groups of nanoparticles may in embodiments be applied 740 to the target surface. The fluorinated nanoparticles may be applied 750 to the target surface by spraying or immersion and deposition.

These and other objectives and features of the invention are apparent in the disclosure, which includes the above and ongoing written specification.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the invention has been described with reference to specific illustrative embodiments, modifications and variations of the invention may be constructed without departing from the spirit and scope of the invention as set forth in the following claims.

We claim:

1. A method for preparing an icephobic surface, comprising:
    cleaning and etching and/or anodizing a target surface, thereby resulting in a porous surface with pores ranging from 5-500 nm in diameter and depth ranging from 50-5000 nm; and
    applying a coating directly to the porous surface, the coating consisting of fluorinated superhydrophobic silica nanoparticles, thereby resulting in an icephobic surface,
    wherein the silica nanoparticles comprise non-fumed silica, and wherein the coating has a thickness of less than 50 microns.

2. The method of claim 1, wherein the cleaning and etching and/or anodizing of the target surface further comprises:
    a first step of cleaning the target surface with at least one of a degreasing hydrocarbon and an alcohol and etching the target surface a first time with 0.1 to 5M of etching base for 1 to 15 minutes,
    a second step of anodizing the target surface a first time for 0.25 to four hours with 0.3 to 2M of acid at 0 to 10° C. and 1-40V and etching a second time with 0.1 to 5M of etching base, and
    a third step of anodizing the target surface a second time with 0.3 to 3M of acid at 0-10° C. and 1-40V and etching a third time with 1M of etching base for 1 to 3 minutes.

3. The method of claim 2, wherein the target surface comprises an aluminum-based alloy.

4. The method of claim 2, wherein at least one of the first, second and third etchings uses at least one of sodium hydroxide and potassium hydroxide and at least one of the first and second anodizings uses at least one of oxalic acid, sulfuric acid, hydrochloric acid, and nitric acid.

5. The method of claim 2, wherein the first, second, and third etchings use the same etching base and the first and second anodizings use the same acid.

6. The method of claim 2, further comprising one or more additional cycles of etching and anodizing the target surface before applying the fluorinated nanoparticles.

7. The method of claim 2, further comprising repeating the first and/or second anodizings.

8. The method of claim 2, wherein the first, second, and third etchings use different etching bases and the first and second anodizings use different acids.

9. The method of claim 1, wherein the etching comprises immersing the target surface in 5% nitric acid for 1 to 60 minutes at 15 to 75° C. temperature, wherein the target surface comprises a metal substrate.

10. The method of claim 9, wherein the target surface comprises at least one of a copper, a nickel and an iron-based alloy.

11. The method of claim 1, wherein the anodizing comprises immersing the target surface in 0.3 to 3M oxalic acid and applying a voltage of 1-40V at 0-10° C. for 3 minutes to eight hours, and wherein the oxalic acid has a pH less than 3.

12. The method of claim 1, further comprising preparing the fluorinated silica nanoparticles by combining silica nanoparticles with trichloro (1h 1h 2h 2h-perfluorooctyl) silane molecules in hydrocarbon-based solvent.

13. The method of claim 12, further comprising applying at least some nanoparticles that are at least one of metallic and ceramic.

14. The method of claim 1, wherein applying the fluorinated silica nanoparticles comprises at least one of spraying, immersion and deposition.

15. The method of claim 1, further comprising applying at least some nanoparticles that are at least one of metallic and ceramic.

16. The method of claim 15, wherein the at least some of the nanoparticles comprise at least one of silver, copper, nickel, and palladium.

17. The method of claim 16, wherein the at least some of the nanoparticles comprise at least one of silica, alumina, and titania.

18. The method of claim 1, wherein the nanoparticles have been fluorinated using one or more of perfluoro octyl trichloro silane, perfluoro octyl phosphonic acid, perfluoro polyhedral oligomeric silsesquioxanes (POSS), trichloro octa decyl and trichlor octyl silane.

19. The method of claim 1, wherein the nanoparticles have been fluorinated using one or more of perfluorosiloxane, fluorohydrocarbon, fluorinated silane, fluorinated acid, amine, phosphoric acid, alcohol, acrylates, epoxy, ester, ethers, and sulfonate.

20. The method of claim 1, further comprising first applying groups of nanoparticles to the target surface before applying the fluorinated silica nanoparticles.

21. The method of claim 1, wherein the target surface is ceramic.

* * * * *